United States Patent
O'Lenick, Jr.

(10) Patent No.: US 7,495,062 B1
(45) Date of Patent: Feb. 24, 2009

(54) SILICONE METHOXY ESTER COMPOSITIONS

(75) Inventor: Anthony J. O'Lenick, Jr., Dacula, GA (US)

(73) Assignee: Siltech LLC, Dacula, GA (US)

( * ) Notice: Subject to any disclaimer, the term of this patent is extended or adjusted under 35 U.S.C. 154(b) by 676 days.

(21) Appl. No.: 11/296,076

(22) Filed: Dec. 8, 2005

Related U.S. Application Data

(60) Provisional application No. 60/637,191, filed on Dec. 20, 2004.

(51) Int. Cl.
*C08G 77/14* (2006.01)
(52) U.S. Cl. .................. 528/26; 556/445; 424/70.12
(58) Field of Classification Search ............. 528/26; 556/445; 424/70.12
See application file for complete search history.

(56) References Cited

U.S. PATENT DOCUMENTS

| | | | | | |
|---|---|---|---|---|---|
| 4,724,248 | A | * | 2/1988 | Dexter et al. ................. | 524/262 |
| 5,226,923 | A | * | 7/1993 | O'Lenick, Jr. ............... | 8/115.6 |
| 5,401,870 | A | * | 3/1995 | Raleigh et al. .............. | 556/445 |
| 5,451,692 | A | * | 9/1995 | Raleigh et al. .............. | 556/445 |
| 5,527,855 | A | * | 6/1996 | Petroff et al. ................ | 524/755 |
| 6,162,888 | A | * | 12/2000 | Lee et al. ...................... | 528/25 |
| 6,306,906 | B1 | * | 10/2001 | Wohlman et al. ........... | 514/552 |
| 6,630,180 | B1 | * | 10/2003 | Klein et al. .................. | 424/765 |
| 6,646,144 | B1 | * | 11/2003 | Klein et al. ................... | 554/77 |

* cited by examiner

*Primary Examiner*—Margaret G Moore

(57) ABSTRACT

The present invention relates to a series of dimethicone copolyol compounds that contain both methoxy capped groups and hydroxyl groups that are esterified with fatty acids or triglycerides. The resulting products are outstanding emulsifiers and conditioners.

12 Claims, No Drawings

SILICONE METHOXY ESTER COMPOSITIONS

CROSS-REFERENCE TO RELATED APPLICATIONS

This application claims priority to and benefit of U.S. Provisional Application No. 60/637,191, Dec. 20, 2004, the disclosures of each of which are incorporated herein for all purposes

STATEMENT REGARDING FEDERALLY SPONSORED RESEARCH OR DEVELOPMENT

No Federal Sponsorship

BACKGROUND OF THE INVENTION

For many years, there has been an industry desire to develop products that provide effective lubrication of fibers. These fibers include hair and a variety of textile fibers including cotton, rayon, nylon, and polyester. The need for an effective lubricant has grown recently with the popularity of microfibers, a very low denier fiber. The smaller the fiber, the greater the need for lubrication to prevent breakage during processing. As will become clear, the ability to provide effective lubrication was limited first by the chemistry of the lubrication compounds and then by the limitations of formulating these compounds into compositions.

By lubrication and conditioning, we mean the alteration of the fiber surface to provide a softer more appealing feel to the touch and at the same time provide lower friction values when the fibers pass over each other or when they pass over other objects, like metal parts or combs. In general, lubrication is the alteration of the surface to effect these changes. Conditioning is a type of lubrication in which the aesthetics of the lubricant are appealing. Hair is conditioned, fibers are generally lubricated, but both are related concepts.

Very early products aimed at lubricating and conditioning of fibers were simply oil or silicone emulsions. These composition included an oil phase (hydrocarbon, triglyceride or silicone oil), one of more emulsifiers and water. The difficulty with this approach was two fold. The first was that emulsions are metastable materials, and given enough time will separate. In addition, these emulsions are very sensitive to addition of additional surface active materials since the addition would alter the surfactant balance of the original emulsion and lead to splitting of the emulsion. That splitting would manifest itself by the formation of a water phase and an oil phase from a product that was homogeneous milk like liquid. This inability to add other ingredients limits the use of such products.

More recently, there has been a desire to make a soluble molecule that contains both silicone soluble groups and water soluble groups. These products are called silicone glycols. The products overcame the limitations related to emulsification, but in order to obtain a suitable level of water solubility, the lubrication and conditioning properties were significantly lessened. The compromised conditioning and lubrication properties, their inability to provide emulsification properties and their high cost limited the usefulness of such materials.

Several attempts were made to combine in one molecule water soluble groups, silicone soluble groups and oil soluble groups to make a truly functional lubricant for use in aqueous systems. One class of compounds are the silicone esters. Silicone esters have been known for years. U.S. Pat. No. 4,724,248 issued February 1988 to Dexter et al is the first patent to disclose silicone fatty esters, primarily for use in electrical systems. O'Lenick et al in U.S. Pat. No. 5,136,063 issued Aug. 4, 1992 later expanded the field. Still later, these materials were modified using specific triglycerides to maintain properties of the oil. These include U.S. Pat. No. 6,646,144 to Klein discloses cranberry based silicone esters and U.S. Pat. No. 6,630,180 to Klein discloses raspberry silicone esters.

While functional as skin care materials, these materials do not have the necessary properties to make a truly functional highly efficacious conditioner/lubricant. In fact, the recent approaches listed above indicate the desirability of making a compound that will provide the necessary functionality, rather than a specifically targeted composition. In other words, the recent trends in the art teach away from the use compositions.

Providing conditioning and lubrication to fiber is a complicated process, particularly when it is attempted with one compound. The process of conditioning or lubricating the fiber from aqueous solution includes several often-competitive processes including wetting of the fiber, and the deposition of the lubricant or conditioner onto the fiber. For example if one uses the silicone esters disclosed in U.S. Pat. No. 5,136,063, the specific ester chosen must have (a) water solubility, (b) wetting properties to allow for the uniform distribution of the molecule on the fiber, (c) ability to deposit rather than to wash off and (d) outstanding conditioning effects. Unfortunately, the selection of a molecule that has all properties has been elusive. This is because the optimization of one property is achieved at the expense of another. If one wants to improve water solubility one can add a lager water soluble group. This would decrease wetting, minimize deposition, increase wash off and lower conditioning effectiveness.

In order to attempt to overcome these problems, we looked at making compositions, containing one silicone molecule and an added surface active agent. The concept was to make a composition that would allow various processes to go on simultaneously, with minimal interferences one to the other. Many approaches simply did not work due to interactions between the compounds and interferences in the various processes.

BRIEF SUMMARY OF THE INVENTION

The present invention is directed to compositions that surprisingly provide outstanding lubrication and conditioning to fibers. Key to the invention is the realization that the there must be an alkoxylated silicone compound with a very specific amount of water soluble groups, (b) a very specific number of esterified groups on alkoxylated groups and an ability to place differing amounts of alkoxylation specifically into the molecules. As will become clear from the disclosure, unless the molecule is very specifically made, the desired lubricating and conditioning compositions will not be achieved.

DETAILED DESCRIPTION OF THE INVENTION

The present invention is directed to a compound which conforms to the following structure:

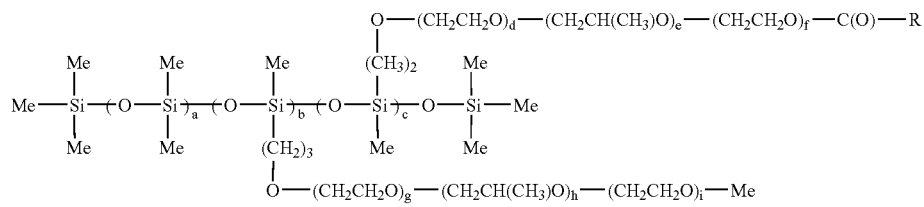

wherein

Me is methyl;

a is an integer ranging from 0 to 200;

b is an integer ranging from 1 to 20;

c is an integer ranging from 1 to 20;

d, e, f, g, h, and i are all integers independently ranging from 0 to 20;

R is alkyl having 7 to 35 carbon atoms.

An additional aspect of the present invention is a process for treating hair with compositions of the present invention, which comprise contacting the hair with an effective conditioning concentration of the following composition:

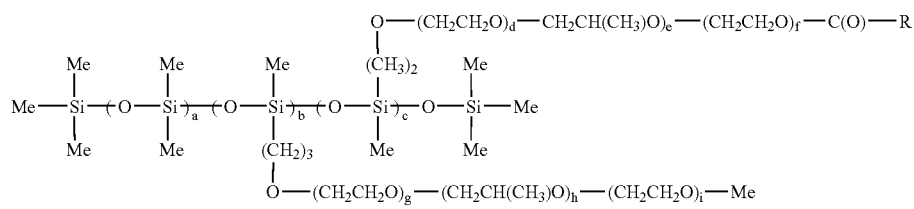

wherein

Me is methyl;

a is an integer ranging from 0 to 200;

b is an integer ranging from 1 to 20;

c is an integer ranging from 1 to 20;

d, e, f, g, h, and i are all integers independently ranging from 0 to 20;

R is alkyl having 7 to 35 carbon atoms.

The effective conditioning concentration ranges from 0.1% by weight to 10.0% by weight.

The key to the invention is the ability to control the (b) and (c) subunits in the structure. The ability to very specifically control the structure is key to function of these materials. The prior art compounds relied upon esterification or partial esterification of the hydroxyl group on dimethicone copolyol.

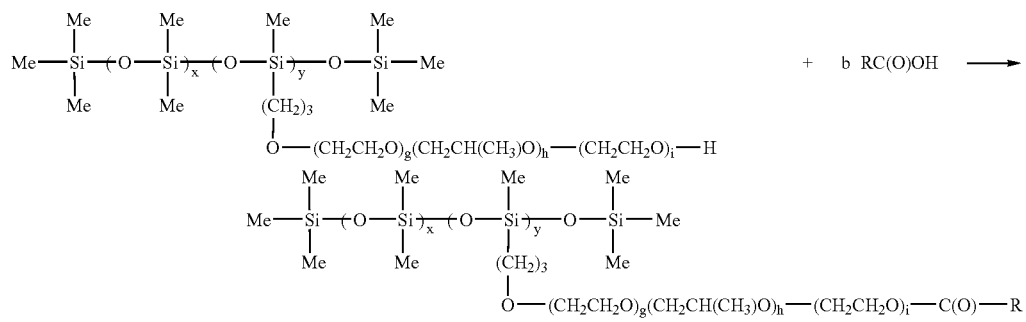

The above reaction requires all of the groups be esterified.

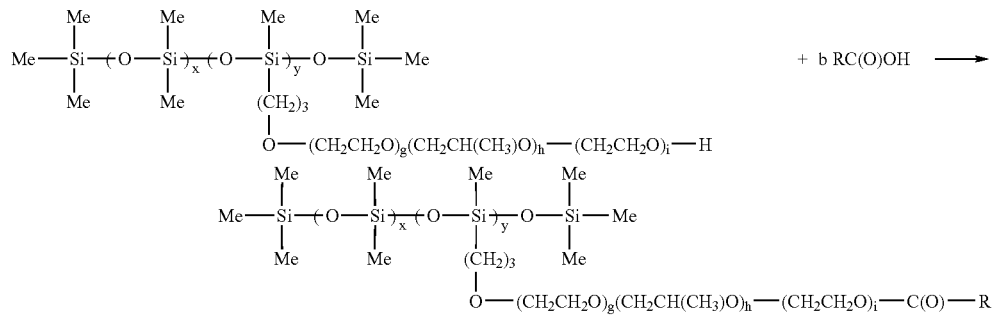

Our new technology allows for the esterification of some of the water soluble groups and not others. This is due to the fact that the esterified groups on our molecule are derived from hydroxy terminated groups and non esterified groups are capped with methoxy groups.

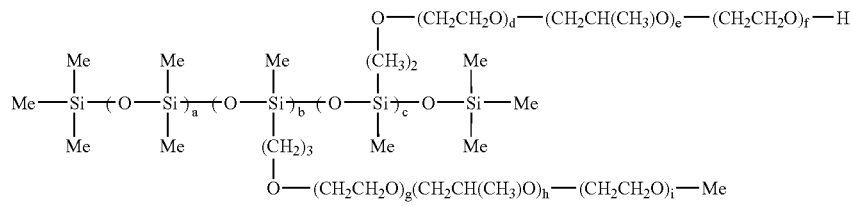

Simply put, capped groups do not esterify. In addition to being able to determine the ratio of groups that are esterified, it is possible to have differing values of d, e, and f relative to g. h and i. If partial esterification is used d is identical to g, h is identical to h and f identical to i. This is because one dimethicone copolyol group is present that is one with hydroxyl groups.

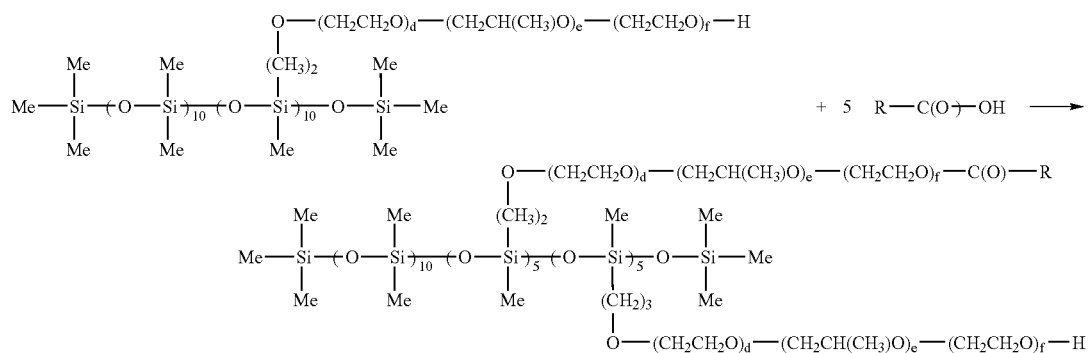

Our new technology allows us to customize the two alkoxylated groups independently making unique molecules. The uniqueness relates to the ability of the molecule to orientate itself at the interface between water and oil. The alkoxylated groups that are introduced with the capped technology are free to rotate around the flexible Si—O—Si bonds. This results in a ease in allowing them to easily enter a water phase. The groups that are esterified contain a fatty portion that is the ester. This places severe restrictions on the ease with which the water soluble group enters either the oil or water phase. The result is instead of forming tight micelles, the molecules form more complicated structures including lamallar sheets. This phenomenon makes these materials uniquely useful in emulsions.

Of particular interest are molecules in which the value of b is 5 or over and the value of c is less than 5. The reason for this is because a product with a high level of alkoxylation and therefore water solubility, and a narrow product distribution is able to be achieved. Products made with just hydroxyl groups cannot provide this type of product. If there are for example twenty hydroxyl groups and you want to substitute 5 of them, you get a very broad distribution of species. This is because there is no appreciable group specificity in the various hydroxyl groups. Consequently, they react in a random matter. A very wide distribution ranging from no can be made. The products of the present invention would be able to make a very narrow distribution. In the case where you want to have five of twenty groups reacted, you incorporate only five hydroxyl groups in the molecule and leave the others methoxy capped. A very narrow distribution results, which has not only unique solubility, but also unique conditioning effects.

Another very important difference is when the amount of alkylene oxide on the molecule in the methoxy group is different from that in the hydroxy terminated portion. Of particular interest is when the hydroxyl group contains less than 5 alkylene oxide groups. (that is d+e+f is less than 5), and the methoxy group contains over 8 alkylene oxide groups (that is g+h+i is greater than 8). This results in what we call a disproportional product. The products of this type are outstanding emulsifiers.

PREFERRED EMBODIMENT

In a preferred embodiment d does not equal g, e does not equal h and f does not equal i.
In a preferred embodiment R is C 11.
In a preferred embodiment R is C17.
In a preferred embodiment R is C34.
In a preferred embodiment R is derived from coconut oil.
In a preferred embodiment R is derived from meadowfoam oil
In a preferred embodiment R is C20.
In a preferred embodiment R is derived from olive oil.
In a preferred embodiment b is greater than 5 and c is less than 5.
Examples Raw Materials
Fatty Acids
Fatty acids are items of commerce available from a variety of sources including Cognis Chemical in Cincinnati Ohio. They are designated by the carbon number and unsaturation.
Fatty Acid Designations

| Designation | Name | Formula |
|---|---|---|
| C8 | Caprylic acid | $C_8H_{16}O_2$ |
| C10 | Capric acid | $C_{10}H_{20}O_2$ |
| C12 | Lauric acid | $C_{12}H_{24}O_2$ |
| C14 | Myristic acid | $C_{14}H_{28}O_2$ |
| C16 | Palmitic acid | $C_{16}H_{32}O_2$ |
| C18 | Stearic acid | $C_{18}H_{36}O_2$ |
| C18:1 | Oleic acid | $C_{18}H_{34}O_2$ |
| C20 | Arachidic acid | $C_{20}H_{40}O_2$ |
| C22 | Behenic acid | $C_{22}H_{44}O_2$ |
| C22:1 | Erucic acid | $C_{22}H_{42}O_2$ |
| C34 | Geddic acid | $C_{34}H_{68}O_2$ |

It will clearly be understood that when a product is designated as C12, it conforms to the structure $CH_3-(CH_2)_{11}-C(O)-OH$. When represented as $R-C(O)-$ the R group has only 11 carbon atoms, since one is in the C(O) group.
Oils
It will also be clearly understood that triglycerides can also be used as raw materials in the preparation of the compounds of the present invention. Oils are triglycerides conforming to the following structure:

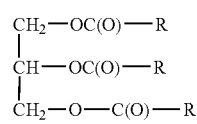

When the triglyceride reacts with the dimethicone copolyol glycerin is produced.
Coconut Oil
Coconut oil is the most abundant oil processed it is a commercially available commodity. Coconut oil comes from the seeds of *Cocos Nucifera*. It is the most common oil raw material used in the cosmetic industry. Geographically, is cultivated principally from Southeast Asia and the Philippines and is the major source of lauric acid (C-12). Coconut oil has a CAS Number:8001-31-8 and EINECS Number: 232-282-8.
The typical carbon distribution is:

| Component | Typical % Weight |
|---|---|
| C-8 | 8 |
| C-10 | 7 |
| C-12 | 48 |
| C-14 | 19 |
| C-16 | 8 |
| C-18 | 3 |
| C-18:1 | 5 |
| C-18:2 | 2 |

Olive Oil
Olive oil is a commercially available triglyceride, which has occupied a unique position in civilization. It is the oldest oil known to man. It is produced throughout the area that was once the Roman Empire. It has the following CAS Number: 8001-25-0 and the following EINECS Number:232-277-0
The typical carbon distribution is:

| Component | Typical % Weight |
|---|---|
| C-16 | 8 |
| C-18 | 2 |
| C-18:1 | 84 |
| C-18:2 | 6 |

Meadowfoam Seed Oil
Meadowfoam oil is a triglyceride derived from the herbaceous winter plant (Limnanthes Alba). It is grown in the southern portion of the State of Oregon. Since the flowers have an appearance of a canopy of white foam, the name meadowfoam was given to the plant. This material is a relatively new raw material, and is unique in that it has both a high concentration of fractions at or above twenty carbons and it has a unique arrangement of double bonds. The fact that the double bonds in the doubly unsaturated product are not conjugated, as in linoleic acid, the oil is liquid to very low temperatures, and is stable to oxidation. The CAS Number: is 153065-40-8
Meadowfoam seed oil has the following carbon distribution:

| Component | Typical % Weight |
|---|---|
| C20:1 | 64 |
| C20:2 | 11 |
| C22:1 | 2 |
| C22:1 | 12 |
| C22:2 | 11 |

Meadowfoam seed oil is available from The Fanning Corporation.
(a) Dhnethicone Copolyol
Raw material dimethicone copolyol compounds of the present invention are available from Siltech LLC, Dacula Ga and conform to the following structure:

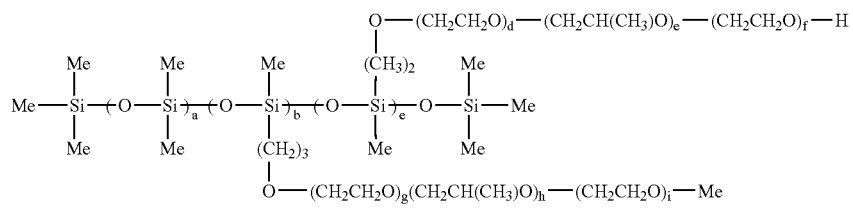

wherein

Me is methyl;

a is an integer ranging from 0 to 200;

b is an integer ranging from 1 to 20;

c is an integer ranging from 1 to 20;

d, e, f, g, h, and i are all integers independently ranging from 0 to 20.

|  | Silicone Units | | | Hydroxy Groups | | | Methoxy Groups | | |
|---|---|---|---|---|---|---|---|---|---|
| Example | a | b | c | d | e | f | g | h | i |
| 1 | 0 | 1 | 1 | 1 | 0 | 1 | 10 | 0 | 5 |
| 2 | 1 | 5 | 2 | 5 | 1 | 5 | 5 | 1 | 5 |
| 3 | 5 | 4 | 5 | 10 | 2 | 1 | 7 | 0 | 3 |
| 4 | 8 | 2 | 10 | 5 | 1 | 3 | 8 | 0 | 0 |
| 5 | 9 | 4 | 15 | 0 | 0 | 0 | 0 | 5 | 0 |
| 6 | 10 | 5 | 6 | 20 | 20 | 20 | 20 | 20 | 20 |
| 7 | 10 | 3 | 20 | 0 | 0 | 8 | 0 | 0 | 6 |
| 8 | 25 | 15 | 5 | 15 | 5 | 0 | 10 | 10 | 10 |
| 9 | 50 | 20 | 6 | 3 | 7 | 3 | 6 | 5 | 5 |
| 10 | 200 | 20 | 7 | 5 | 0 | 0 | 10 | 1 | 10 |

Compounds of the Present Invention

General Procedure

To a clean dry reaction flask with heat, thermometer, agitation and an ability to remove generated water is added the specified number of grams of the specified fatty acid or oil. Next add the specified number of grams of the specified number of grams of dimethicone copolyol (examples 10). Add 0.1% of stannous oxylate. Heat to 200° C. and hold eight hours.

|  | Fatty Acid or oil | | Dimethicone Copolyol | |
|---|---|---|---|---|
| Example | Example | Grams | Example | Grams |
| 11 | Caprylic acid | 144.0 | 1 | 1148.0 |
| 12 | Coconut oil | 230.0 | 2 | 2278.0 |
| 13 | Lauric acid | 228.0 | 3 | 1273.0 |
| 14 | Stearic acid | 284.0 | 4 | 698.0 |
| 15 | Olive oil | 280.0 | 5 | 283.0 |
| 16 | Oleic acid | 282.0 | 6 | 5757.0 |
| 17 | Behenic acid | 340.0 | 7 | 573.0 |
| 18 | Erucic acid | 338.0 | 8 | 6240.0 |
| 19 | Meadowfoam oil | 340.0 | 9 | 4429.0 |
| 20 | Geddic acid | 580.0 | 10 | 5496.0 |

The compounds of the present invention are used without additional purification.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth hereinabove but rather that the claims be construed as encompassing all the features of patentable novelty which reside in the present invention, including all features which would be treated as equivalents thereof by those skilled in the art to which the invention pertains

I claim:

1. A silicone ester conforming to the following structure:

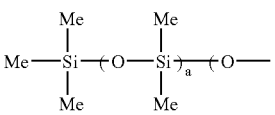

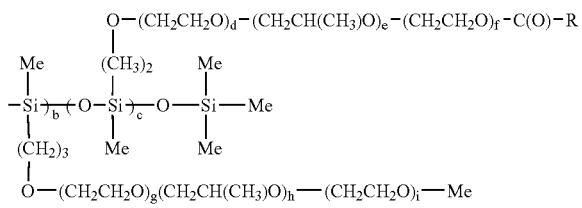

wherein

Me is methyl;

a is an integer ranging from 0 to 200;

b is an integer ranging from 1 to 20;

c is an integer ranging from 1 to 20;

d, e, f, g, h, and i are all integers independently ranging from 0 to 20;

d does not equal g, e does not equal h and f does not equal i,

R is alkyl having 7 to 35 carbon atoms.

2. A silicone ester of claim 1 wherein R is C11.

3. A silicone ester of claim 1 wherein R is C17.

4. A silicone ester of claim 1 wherein R is C35.

5. A silicone ester of claim 1 wherein R is C21.

6. A process for treating hair with compositions of the present invention, which comprise contacting the hair with an effective conditioning concentration of the following composition:

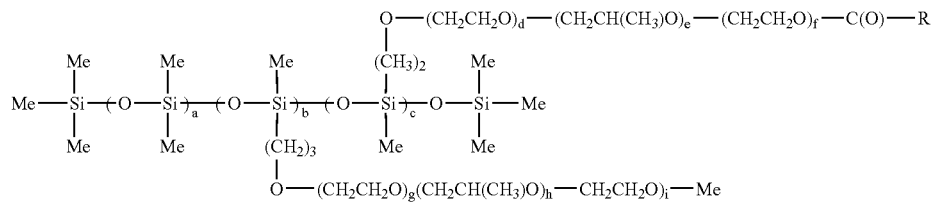

wherein

Me is methyl;
a is an integer ranging from 0 to 200;
b is an integer ranging from 1 to 20,
c is an integer ranging from 1 to 20;
d, e, f, g, h, and i are all integers independently ranging from 0 to 20;
d does not equal g, e does not equal h and f does not equal i,
R is alkyl having 7 to 35 carbon atoms.

7. A process of claim 6 wherein R is C11.
8. A process of claim 6 wherein R is C17.
9. A process of claim 6 wherein R is C35.
10. A process of claim 6 wherein R is C21.
11. A silicone ester conforming to the following structure:

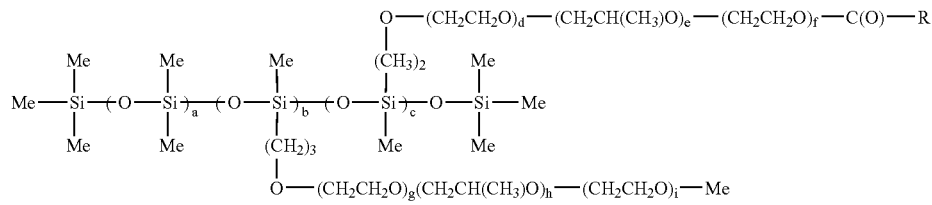

wherein
Me is methyl;
a is an integer ranging from 0 to 200;
b is an integer ranging from 1 to 20;
c is an integer ranging from 1 to 20;
d, e, f, g, h, and i are all integers independently ranging from 0 to 20;
R is alkyl having 35 carbon atoms.

12. A process for treating hair with compositions of the present invention, which comprise contacting the hair with an effective conditioning concentration of the following composition:

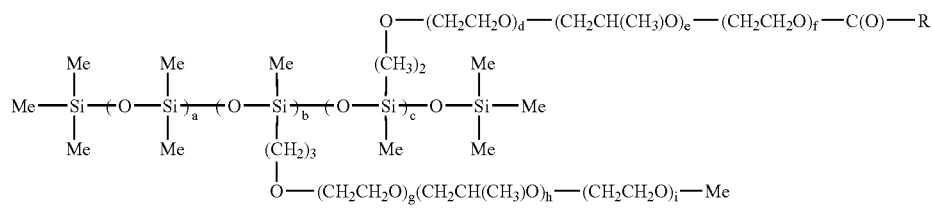

wherein
Me is methyl;
a is an integer ranging from 0 to 200;
b is an integer ranging from 1 to 20;
c is an integer ranging from 1 to 20;
d, e, f, g, h, and i are all integers independently ranging from 0 to 20;
R is alkyl having 35 carbon atoms.

* * * * *